(12) United States Patent
Maguire et al.

(10) Patent No.: US 9,806,320 B2
(45) Date of Patent: Oct. 31, 2017

(54) TRACTION BATTERY ASSEMBLY

(71) Applicant: Ford Global Technologies, LLC, Dearborn, MI (US)

(72) Inventors: Patrick Daniel Maguire, Ann Arbor, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/482,102

(22) Filed: Apr. 7, 2017

(65) Prior Publication Data

US 2017/0214015 A1    Jul. 27, 2017

Related U.S. Application Data

(62) Division of application No. 14/134,290, filed on Dec. 19, 2013, now Pat. No. 9,653,720.

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2/202* (2013.01); *H01M 2220/20* (2013.01)

(58) Field of Classification Search
CPC ..... H01M 2/1077; H01M 2/202; H01M 2/206

USPC ......................................................... 429/121
See application file for complete search history.

(56) References Cited

U.S. PATENT DOCUMENTS

| 4,040,712 | A | 8/1977 | Dahlstrom |
| 4,449,771 | A | 5/1984 | Carr |
| 5,880,951 | A | 3/1999 | Inaba |
| 8,114,540 | B2 | 2/2012 | Trester et al. |
| 2010/0247996 | A1* | 9/2010 | Ijaz ..................... H01M 2/1077 429/120 |
| 2010/0248010 | A1 | 9/2010 | Butt et al. |
| 2012/0315531 | A1 | 12/2012 | Lev et al. |
| 2013/0330595 | A1 | 12/2013 | Lee et al. |

* cited by examiner

*Primary Examiner* — Basia Ridley
*Assistant Examiner* — James Erwin
(74) *Attorney, Agent, or Firm* — David Kelley; Brooks Kushman, P.C.

(57) ABSTRACT

A traction battery assembly includes adjacent battery cells supported by a tray and a busbar electrically connecting the adjacent battery cells. The busbar includes a longitudinal midpoint and a pair of bowed sections joined at the midpoint. Each of the bowed sections has an actuate portion in contact with a terminal on one of the cells. The bowed sections provide increased contact with the cells when the cells have different elevations with respect to the tray. A busbar module is also disclosed. The busbar module comprises a housing and a busbar supported within the housing.

15 Claims, 4 Drawing Sheets

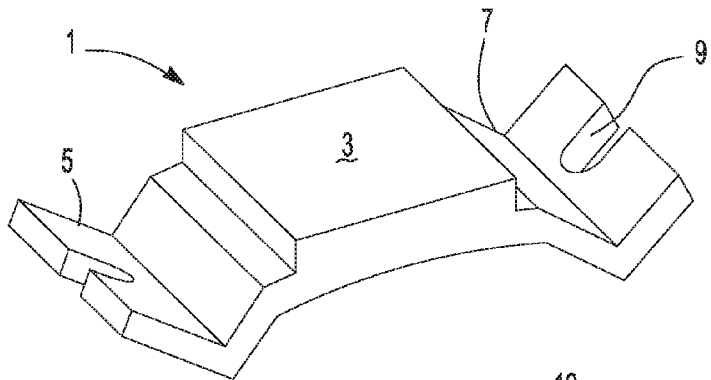
Fig-1
*Prior Art*
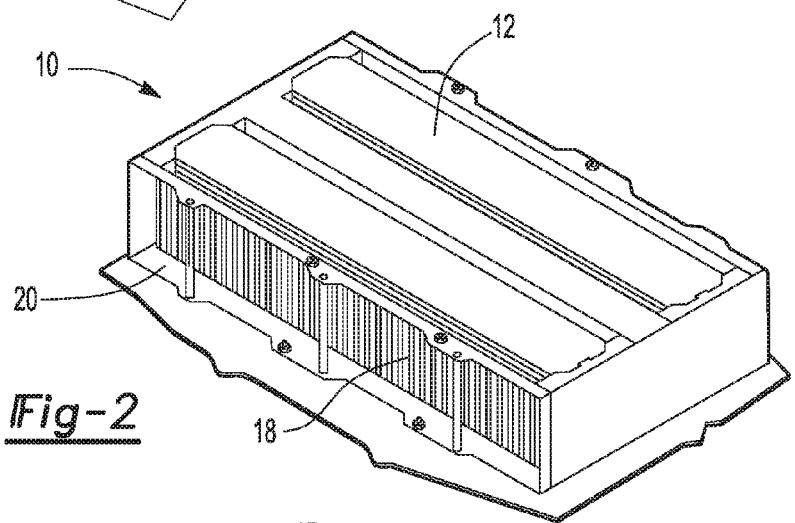
Fig-2
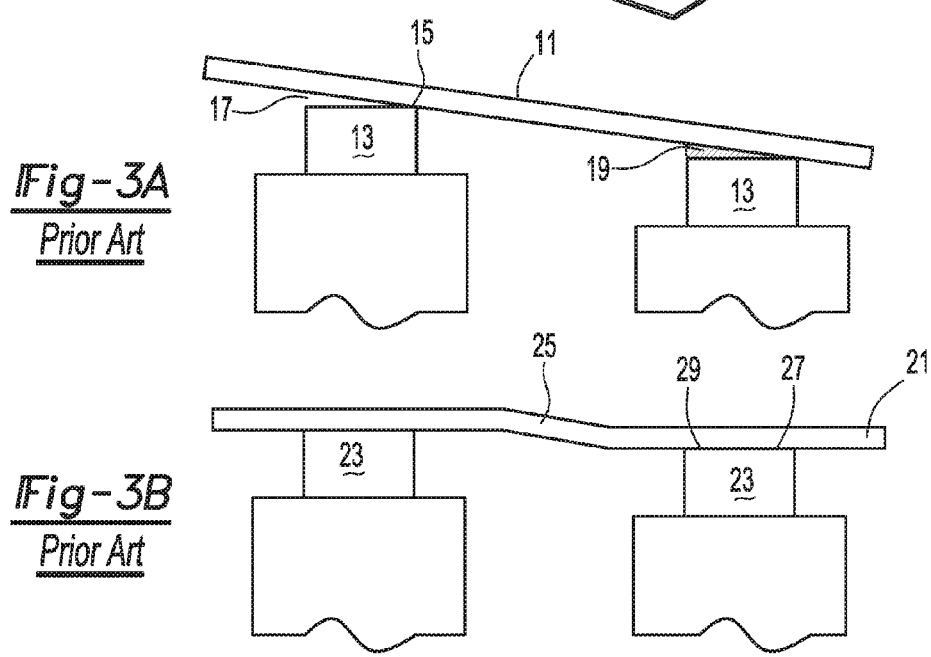
Fig-3A
*Prior Art*
Fig-3B
*Prior Art*

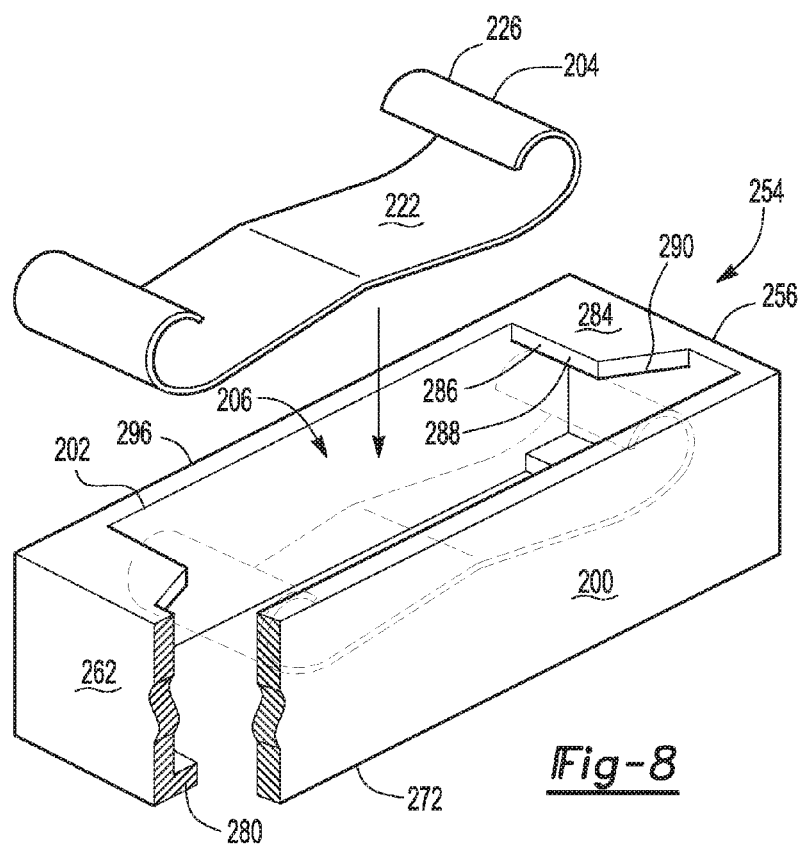
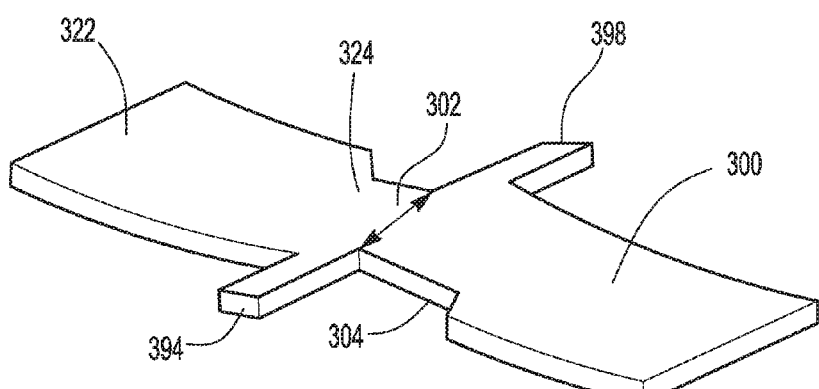

TRACTION BATTERY ASSEMBLY

CROSS-REFERENCE TO RELATED APPLICATIONS

This application is a division of U.S. application Ser. No. 14/134,290 filed Dec. 19, 2013, now U.S. Pat. No. 9,653,720, issued May 16, 2017, the disclosure of which is hereby incorporated in its entirety by reference herein.

TECHNICAL FIELD

This disclosure relates to busbars for vehicle traction battery assemblies.

BACKGROUND

Vehicles such as battery-electric vehicles (BEVs), plug-in hybrid electric vehicles (PHEVs) or hybrid-electric vehicles (HEVs) contain a battery pack with a traction battery to act as an energy source for the vehicle. The battery pack may include components and systems to interact with the battery and assist in managing vehicle performance and operations. The battery pack may include one or more arrays of battery cells with the cell terminals interconnected electrically with busbars.

SUMMARY

A busbar with a pair of curved sections is provided for increasing the contact area between the cell terminals and the curved sections when the cell terminals are at different heights with respect to each other.

In one embodiment, a traction battery assembly comprises adjacent cells including a planar terminal. One planar terminal on each cell is electrically connected by a busbar. The busbar has a longitudinal midpoint and defines a pair of bowed sections joined at the midpoint. An arcuate portion along each of the bowed sections is in contact with one of the terminals when the terminals are at different elevations relative to a battery tray to provide increased contact between the busbar and terminals.

In another embodiment, a traction battery assembly comprises a tray and adjacent cells supported by the tray. A housing is disposed on the cells opposite the tray and spans the adjacent cells. The housing has a pair of opposing sidewalls cooperating to define an enclosure. A busbar is received within the enclosure. The busbar has a longitudinal midpoint and a pair of bowed sections joined at the midpoint. Each of the bowed sections is in contact with one of the terminals when the terminals are at different elevations relative to the tray to provide increased contact between the busbar and terminals.

In yet another embodiment, a traction battery assembly comprises adjacent cells supported by a tray. Each of the cells has a terminal. A busbar electrically connects the cells. The busbar has a longitudinal midpoint and defines a pair of rockers connected at the midpoint. Each of the rockers has a curved portion in contact with one of the terminals. The curved portions are configured to rock along the terminals to provide increased contact between the busbar and terminals when the busbar has an angled orientation caused by a height difference between the terminals.

BRIEF DESCRIPTION OF THE DRAWINGS

FIG. 1 is a perspective view of a prior art busbar.
FIG. 2 is a perspective view of a traction battery assembly.
FIGS. 3A and 3B are side views of prior art busbar and terminal arrangements.
FIG. 8 is a perspective view of a curled edge busbar module.
FIG. 9 is a perspective view of another busbar.

DETAILED DESCRIPTION

Figure 4:
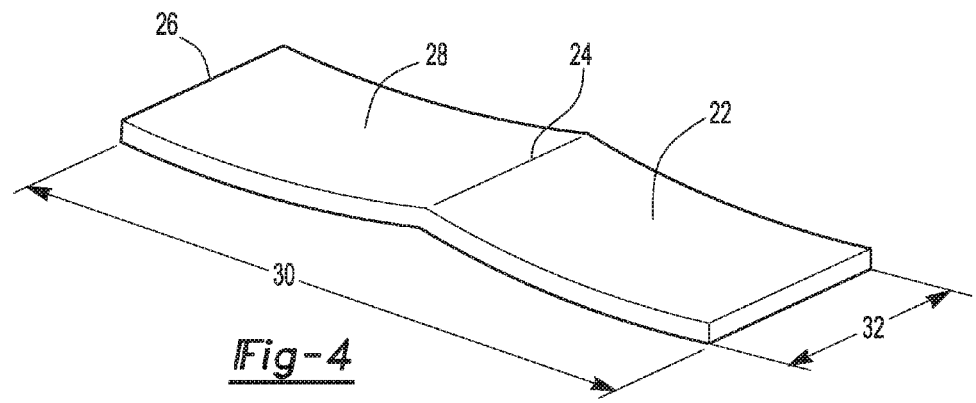
FIG. 4 is a perspective view of a busbar.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a prior art busbar is shown. The busbar 1 has a body 3 with a first terminal connector 5 and a second terminal connecter 7 at opposing ends. The busbar 1 has two semicircular cut-outs 9 sized and shaped to connect to a corresponding circular battery terminal.

Referring to FIG. 2, electric vehicles may include an energy system having a traction battery assembly 10 with components such as one or more battery cell arrays 12, a battery electrical control module (BECM), and a direct current to direct current (DC/DC) converter unit. The battery cell arrays 12 provide energy to operate the vehicle and its systems. The battery arrays 12 are in electrical communication with the BECM, DC/DC converter unit and other vehicle components. The BECM receives input signals from various systems, processes information included in the input signals and generates appropriate control signals in response thereto. These control signals activate and/or deactivate the various components. The DC/DC converter unit converts high voltage from the battery cell arrays into low voltage for use by the components and other systems.

The battery assembly 10 includes a tray 20 for supporting the battery arrays 12. Each battery array 12 is received on the tray 20 and includes a plurality of battery cells 18 connected in series and/or parallel. The battery cells 18, such as a prismatic cell, convert stored chemical energy to electrical energy. The cells 18 include a housing, a positive electrode (cathode) and a negative electrode (anode). An electrolyte allows ions to move between the anode and cathode during discharge, and then return during recharge. Terminals allow current to flow out of the cell for use by the vehicle. When positioned in an array with multiple battery cells, the terminals of each battery cell are aligned with opposing terminals (positive and negative) adjacent to one another to facilitate a series connection between the multiple battery cells. Busbars may be used to assist in completing the series connection between adjacent battery cells or groups of battery cells proximate to one another. Different battery pack configurations may be available to address individual vehicle variables including packaging constraints and power requirements.

Battery cell dimensions may vary within a given tolerance due to manufacturing imperfections, thus adjacent cells may be of slightly different dimension. The positing of the cells 18 in the array 12 also may vary within a given tolerance due to manufacturing imperfections. These imperfections make it common for adjacent cells 18 to have slightly different heights with respect to each other.

A height differential between adjacent cells can cause connections problems between the cell terminals and the busbar because busbars are typically made of rigid, metallic materials. Two possible problems that can occur are illustrated in prior art FIGS. 3A and 3B. In FIG. 3A, a straight busbar 11 is connected to two adjacent cell terminals 13 of different height. The height difference between the terminals causes the busbar 11 to have an angled orientation with respect to the top of the terminals. The angled orientation of the busbar 11 provides a small busbar-terminal interface 15 and a gap 17 between the busbar 11 and the terminals 13. The contact region may be too small to provide for a satisfactory weld and may be in a location that is difficult to located during a welding operation such as the very edge of the terminal. Therefore the weld 19 must extend past the busbar-terminal interface 15 into the gap 17. Welding at the gap 17 requires additional welding materials and time. Welding at the gap may also preclude some methods of welding which cannot tolerate a large gap.

In FIG. 3B, a straight busbar 21 is connected between two adjacent cell terminals 23 of different height. The busbar 21 is pushed flush against each terminal 23. This eliminates the gaps and increases the busbar-terminal interface, but also creates higher stress regions on the busbar 21. Pushing the busbar 21 flush also bends the busbar causing deformation at area 25 proximate the midpoint of the busbar 21. This deformation 25 cold works the busbar 21 and can affect the electrical properties of the busbar 21. The elasticity of the busbar causes increased stress at the terminal-busbar connection 27. This stress over time may fatigue the weld 29 leading to connection issues. A stronger weld may be used to combat the fatigue, but this may increase production cost. The process of pushing the busbar flush against each terminal may also have undesirable effects on the cells in the array if the pushing force is transferred to the array. The process of pushing may also add cost to the array connection process and require additional clearance proximate to the cell terminals to push and hold the busbar in place during the welding operation.

Referring to FIG. 4, a busbar 22 according to the present disclosure is shown. The busbar 22 is a single strip of metal such as copper or aluminum. The busbar 22 has a longitudinal midpoint 24 and two longitudinal endpoints 26 distal to the midpoint 24. The busbar 22 includes a pair of bowed sections 28 defined between the midpoint 24 and a corresponding end point 26. The bowed sections 28 are symmetrical about the midpoint 24. However, the bowed sections 28 may be asymmetrical in certain applications. The bowed sections 28 have a crescent shaped curvature in the longitudinal direction 30 and are flat in the transverse direction 32.

Figure 5A:
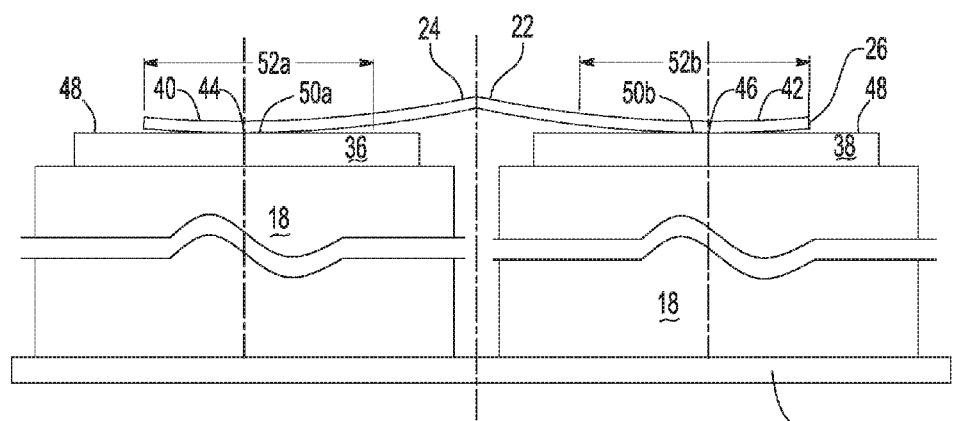
FIGS. 5A and 5B are side views of busbar and terminal arrangements.
Figure 5B:
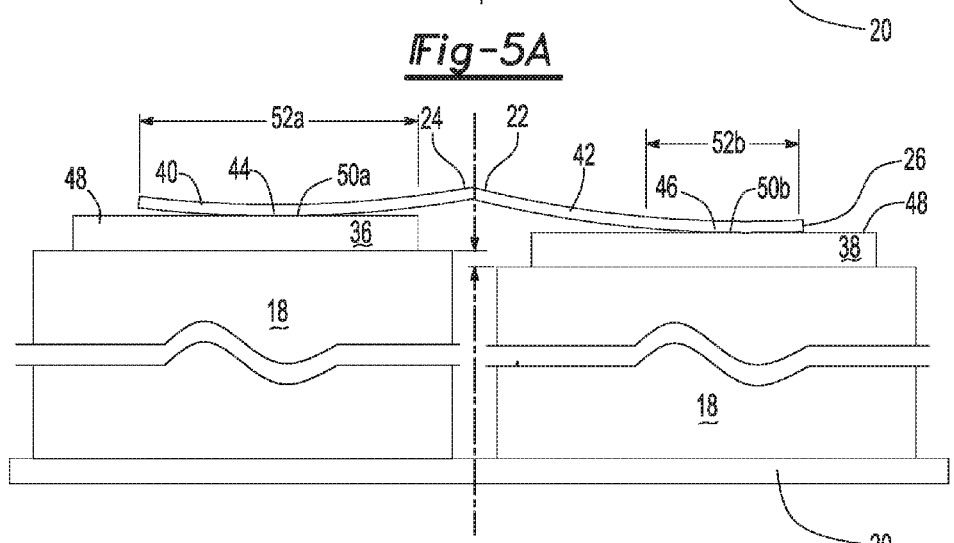

Referring to FIGS. 5A and 5B, an elevation view looking at the long side of the battery array 12 is shown. The battery array 12 has a tray 20 supporting adjacent cells 18. A first cell terminal 36 is extends from one of the cells and a second cell terminal 38 extends from the other cell. The terminals 36, 38 are planar terminals having a generally rectangular shape and a flat top. The first and second terminals 36, 38 are electrically connected by the busbar 22. The busbar 22 has a midpoint 24 and two endpoints 26. The midpoint 24 and end points 26 define a first bowed section 40 and a second bowed section 42. The first bowed section 40 connects to a first cell terminal 36 at a first arcuate portion 44 and the second bowed section 42 connects to the second cell terminal 38 at a second arcuate portion 46.

Referring to FIG. 5A, the distal ends 48 of the first and second terminals 36, 38 have the same elevation with respect to the tray 20. The busbar 22 is disposed on the distal end 48 of the terminals 36, 38 at the first and second arcuate portions 44, 46. The busbar 22 is generally horizontal with the first and second bowed sections 40, 42 having the same elevation with respect to the tray 20. The busbar-terminal interface 50a, 50b on each of the arcuate portions is symmetrical about the midpoint 24 and is centered on the terminals 36, 38. The bowed sections 40, 42 have a weldable range 52a, 52b along a majority of the bowed section beginning at a corresponding endpoint 26 and extending towards the midpoint 24.

Referring to FIG. 5B, the distal ends 48 of first and second terminals 36, 38 have a different elevation with respect to the tray 20. The first terminal 36, for example, is 0.70 mm higher than the second terminal 38. The busbar 22 is disposed on the distal end 48 of the terminals 36, 38 with the first bowed section 40 being higher than the second bowed section 42 with respect to the tray 20. The elevation differential between the terminals 36, 38 causes the busbar 22 to pivot about the midpoint 24 and has an angled orientation with respect to the tray. The curvature of the first and second bowed sections 40, 42 cooperate with each other to provide an increased busbar-terminal interface 50a, 50b and weldable range 52a, 52b when the busbar 22 is in the angled orientation.

Comparing FIGS. 5A and 5B, the busbar-terminal interface 50a along the first bowed section 40 in FIG. 5B has shifted towards the midpoint 24 as the bowed section 40 rocked on the terminal 36 due to the elevation difference between the terminals. The rocking of the first bowed section 40 does not affect the size of the busbar-terminal interface 50a due to the curvature of the bowed section 40. The rocking increases the size of the weldable range 52a and shifts the weldable range 52a towards the midpoint 24.

The busbar-terminal interface 50b along the second bowed section 42 in FIG. 5B has shifted away from the midpoint 24 as the bowed section 42 rocked on the terminal 38 due to the elevation difference between the terminals. The rocking of the second bowed section 42 does not affect the size of the busbar-terminal interface 50b due to the curvature of the bowed section 40. The rocking decreases the size of the weldable range 52b and shifts the weldable range 52b towards the midpoint 24. Even though the weldable range 52b has decreased in size in FIG. 5B, it is still large enough to provide a satisfactory connection. While FIGS. 5A and 5B only illustrate two cells, a person skilled in the art will understand that more than two cells can be interconnected by busbars to form an array.

Figure 6:
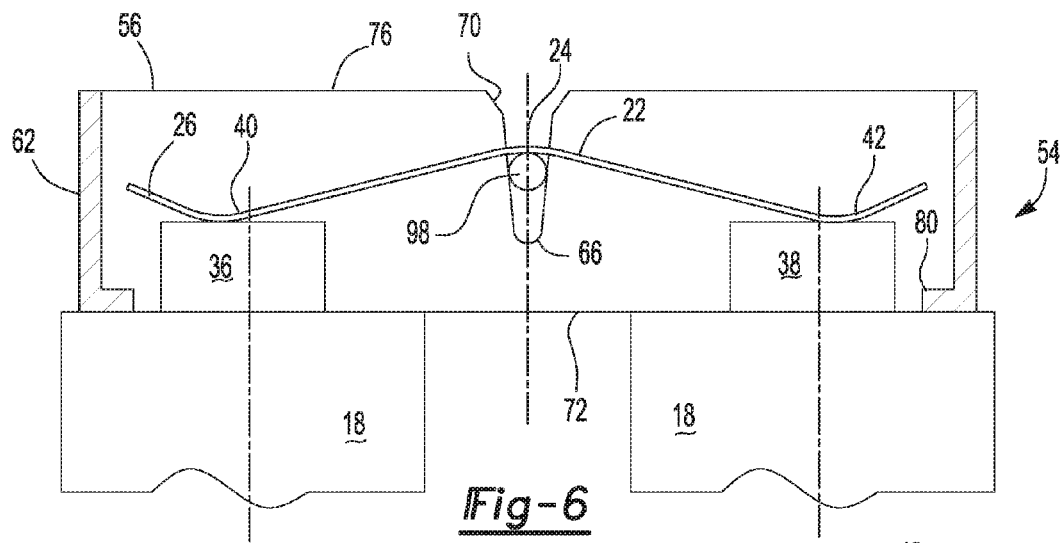
FIG. 6 is a side view of another busbar and terminal arrangement.
Figure 7:
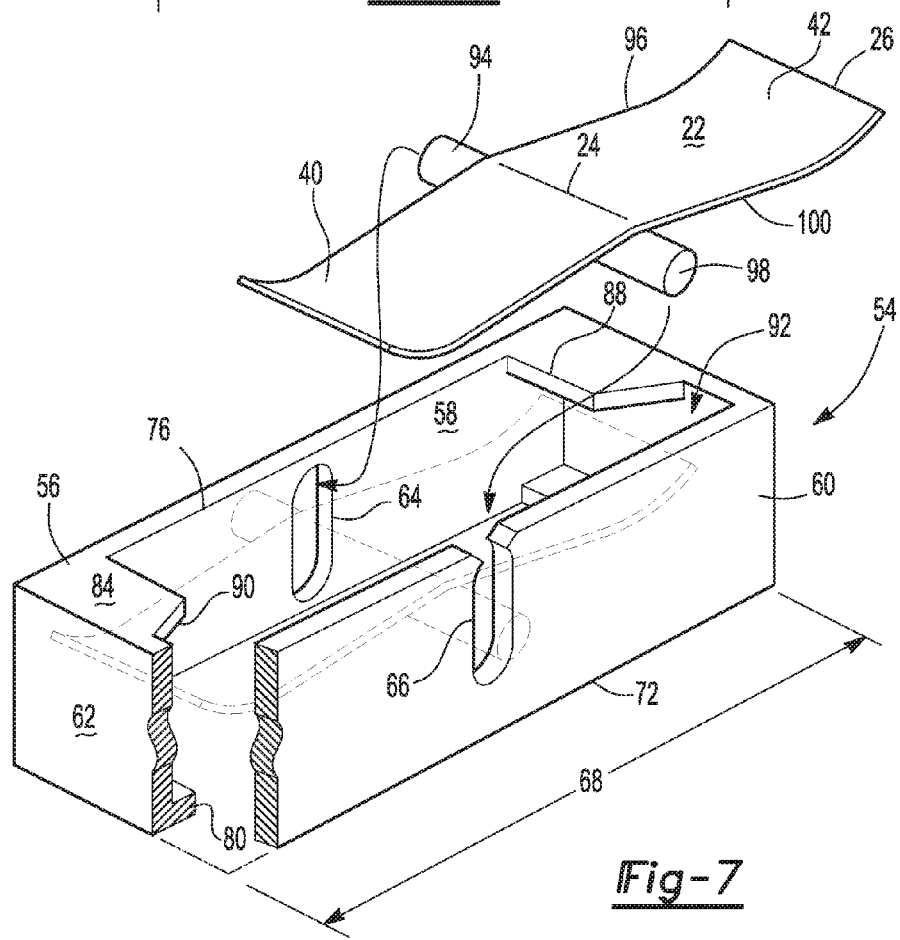
FIG. 7 is a perspective view of a pin and slot busbar module.

Referring to FIGS. 6 and 7, a busbar module 54 is shown. The busbar module 54 comprises a housing 56 and a busbar 22 supported by the housing 56. The busbar housing 56 protects the busbar 22 and serves as a locating device during installation of the busbar 22 onto the battery array 12. The housing 56 has a first sidewall 58 and a second sidewall 60 connected together by a pair of opposing end walls 62 to form a rectangular box. The first sidewall 58 has a first slot 64 arranged perpendicular to a longitudinal axis 68 of the first sidewall 58. The second sidewall 60 has a similarly arranged second slot 66. The second sidewall 60 has a notch 70 opening into the slot 66. The slots 64, 66 are centered at the midpoint of their corresponding sidewalls 58, 60. The housing 56 has a generally open bottom 72 with two partial bottom walls 80. The bottom walls 80 extend from a corresponding end wall 62 partially along the sidewalls 58, 60. The sidewalls 58, 60 and bottom walls 80 define the open bottom 72. The housing 56 has a generally open top 76, which may be covered at a later point to restrict access to the terminals and bussing. The top 76 has two ledges 84. Each of the ledges 84 protrudes into the housing 56 from the first sidewall 58 and a corresponding end wall 62. The ledges 84 have an interior portion 86. The interior portion 86 has a straight portion 88 parallel to the end walls 62 and a tampered portion 90 extending from the straight portion 88 and terminating at a corresponding end wall 62. The ledges 84 do not fully span the end wall 62 providing a full open top along the second sidewall 60. While the busbar module 54 depicted includes a top and a bottom, the present disclosure contemplates a busbar module 54 having a completely open top and bottom. Alternatively, the busbar module 54 may only have a top and not a bottom, or vice versa.

The housing 56 defines an enclosure 92 for receiving the busbar 22 therein. The busbar 22 has a first projection 94 extending outwardly from a first side 96 of the busbar 22 and a second projection 98 extending outwardly from a second side 100 of the busbar 22. The first side 96 of the busbar 22 is inserted into the enclosure 92 first. The first side 96 is inserted through the open top 76 at the largest portion of the opening proximate the second sidewall 60. The first projection 94 is received within the first slot 64. The second projection 98 is received though the notch 70 and into the second slot 66. The slots 64, 66 and the projections 94, 98 cooperate to allow the busbar 22 to rotate about the projections 94, 98 and to move perpendicular but not parallel to the longitudinal axis 68 of the sidewalls 58, 60. The ledges 84 and the bottoms walls 80 cooperate to prevent the busbar 22 from rotating beyond a desired range.

Referring to FIG. 6, the busbar module 54 sits on and spans across the adjacent cells 18. The terminals 36, 38 are received into the housing 56 through the hole 82. The busbar 22 self-adjusts for height along the slots 64, 66 to correctly position on the terminals 36, 38. The busbar 22 self-adjusts for rotation by pivoting in the slots about the projections 94, 98 and allowing the bowed sections 40, 42 to rock along the terminals and correctly seat. After the busbar module 54 has located the busbar 22 into position, additional tooling can be used to weld the busbar 22 to the terminals 36, 38. Additional tooling could also be used to vibrate the busbar module 54 to ensure that the busbar 22 is properly seated on the terminals 36, 38.

Referring to FIG. 8, an alternative busbar module 254 is shown. The busbar module 254 comprises a housing 256 and a busbar 222 supported by the housing 256. The housing 256 has a first sidewall 296 and a second sidewall 200 connected together by a pair of opposing end walls 262 to form a rectangular box and define an enclosure 206. The housing 256 has a generally open bottom 272 with two partial bottom walls 280. The bottom walls 280 extend from a corresponding end wall 262 partially along the sidewalls 200, 296. The sidewalls 200, 296 and bottom walls 280 define an opening. The housing 256 has a generally open top 202. The top has two ledges 284. Each of the ledges 284 protrudes into the housing 256 from the first sidewall 296 and a corresponding end wall 262. The ledges 284 have an interior side 286. The interior side 286 has a straight portion 288 parallel to the end walls 262 and a tapered portion 290 extending from the straight portion and terminating at a corresponding end wall 262. The ledges 284 do not fully span the end walls 262 providing a full opening along the second sidewall 200.

The busbar 222 has a midpoint and a pair of endpoints 226. Each of the endpoints 226 has a curled edge 204. The busbar 222 is received with the enclosure 206 through the open top 202. The curled edges 204 engage with the end walls 262 to align and position the busbar 222 within the housing 256. The curled edges 204 and the end wall 262 cooperate to allow motion perpendicular to the sidewalls 296, 200 but not longitudinally. The ledges 284 and the bottoms walls 280 cooperate to prevent the busbar 222 from rotating beyond a desired range.

FIG. 9 illustrates a busbar 322 of an alternative embodiment. Unlike FIG. 6, the first and second projections 394, 398 in this embodiment are integrally formed by deforming a portion of the main body 300 of the busbar 322. The first projection 394 is formed by cutting the main body 300 at surface 304. The first projection 394 is then bent away from the main body 300 to form a first projection 394 that extends outwardly from the midpoint 324. The second projection 398 is formed in the same manner. This embodiment provides a smallest cross-sectional area along line 302. Line 302 also has work hardening stress resulting from the bending operation. The smaller cross-sectional area and work hardening produce a high resistance point along line 302 which can be tuned to serve as a fuse. This may eliminate the need to provide additional fuses and may also be helpful in satisfying the abuse test conditions for shipping lithium ion batteries.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A traction battery assembly comprising:
   an array of cells including an adjacent pair of cells that each have a planar terminal; and
   a plurality of busbar modules each having a housing and a busbar disposed in the housing, a first of the busbar modules including a first housing having a bottom disposed on the pair of cells and end walls extending upward from the bottom, and including a first busbar having a longitudinal midpoint and defining a pair of bowed sections joined at the midpoint, wherein an arcuate portion along each of the bowed sections is in contact with one of the terminals.

2. The assembly of claim 1 wherein each of the bowed sections has a curled edge configured to engage with one of the end walls.

3. The assembly of claim 1 wherein the pair of bowed sections are symmetrically arranged about the midpoint.

4. The assembly of claim 1 wherein the bottom includes a pair of partial walls each connected to one of the end walls, the pair of partial walls being spaced apart to define an opening in the bottom that receives the terminals therethrough.

5. The assembly of claim 1 wherein the first housing further includes a pair of opposing sidewalls extending between the end walls.

6. The assembly of claim 5 wherein the first housing further includes a pair of ledges each extending from one of the end walls and connected to only one of the sidewalls, the ledges, sidewalls, and end walls cooperating to define an open top of the first housing.

7. The assembly of claim 6 wherein the ledges are connected to a same one of the sidewalls.

8. A traction battery assembly comprising:
a tray;
a pair of adjacent cells supported by the tray and including adjacent terminals with one terminal being part of each cell;
a housing positioned on the cells opposite the tray and spanning the cells, wherein the housing has a pair of opposing sidewalls cooperating to define an enclosure that receives the terminals, and each of the sidewalls defines an aperture; and
a busbar received within the enclosure and extending in a same direction as the sidewalls, the busbar having a longitudinal midpoint and a pair of bowed sections joined at the midpoint, wherein each of the bowed sections is in contact with one of the terminals when the terminals are at different elevations relative to the tray to provide increased contact between the busbar and terminals, and the busbar further has a pair of projections each extending substantially perpendicular from the longitudinal midpoint and received in one of the apertures.

9. The traction battery assembly of claim 8 wherein each of the apertures is a slot arranged perpendicular to a longitudinal axis of a corresponding one of the sidewalls and is configured to allow the busbar to move perpendicular but not parallel to the longitudinal axis of the corresponding sidewall.

10. The assembly of claim 8 wherein a cross-sectional area of the midpoint is less than a cross-sectional area of end portions of the bowed sections such that the midpoint has a resistance greater than a resistance of the end portions.

11. The traction battery assembly of claim 8 wherein the midpoint and bowed sections are configured such that an electrical resistance of the midpoint is greater than a resistance of the bowed sections.

12. A traction battery comprising:
adjacent cells each including a terminal;
a busbar module spanning the cells and including opposing sidewalls defining slots and an enclosure that receives the terminals; and
a busbar having a longitudinal midpoint and defining a pair of rockers connected at the midpoint and projections each extending perpendicularly from the midpoint and into one of the slots, each of the rockers having a curved portion in contact with one of the terminals.

13. The traction battery of claim 12 wherein the pair of rockers are arranged symmetrically about the midpoint.

14. The traction battery of claim 12 wherein the adjacent cells are prismatic cells that include terminal sides from which the terminals extend, and each of the sidewalls are disposed against each of the terminal sides.

15. The traction battery of claim 12 further comprising:
second adjacent cells each including a terminal;
a second busbar module spanning the second adjacent cells and including opposing sidewalls defining slots and an enclosure that receives the terminals of the second adjacent cells; and
a busbar of the second busbar module having a longitudinal midpoint and defining a pair of rockers connected at the midpoint and projections each extending perpendicularly from the midpoint and into one of the slots of the second busbar module, each of the rockers having a curved portion in contact with one of the terminals of the second adjacent cells.

* * * * *